(12) United States Patent
Ho et al.

(10) Patent No.: US 8,949,286 B2
(45) Date of Patent: Feb. 3, 2015

(54) DYNAMIC RECORD MANAGEMENT FOR SYSTEMS UTILIZING VIRTUAL STORAGE ACCESS METHOD (VSAM) DATA SETS WITH A CORRESPONDING VSAM CONTROL BLOCK STRUCTURE

(71) Applicant: International Business Machines Corporation, Armonk, NY (US)

(72) Inventors: Kam H. Ho, Daly City, CA (US); Maya P. Pandya, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/767,653

(22) Filed: Feb. 14, 2013

(65) Prior Publication Data

US 2013/0159658 A1 Jun. 20, 2013

Related U.S. Application Data

(63) Continuation of application No. 13/221,802, filed on Aug. 30, 2011.

(51) Int. Cl.
*G06F 17/30* (2006.01)
*G06F 3/06* (2006.01)
*G06F 12/06* (2006.01)

(52) U.S. Cl.
CPC .............. *G06F 3/064* (2013.01); *G06F 12/06* (2013.01); *G06F 3/06* (2013.01)
USPC ........... 707/803; 707/802; 707/811; 707/795; 711/154; 711/170

(58) Field of Classification Search
CPC .............. G06F 17/30; G06F 17/30286; G06F 17/30289; G06F 3/0674; G06F 3/067; G06F 17/30067; G06F 3/061; G06F 3/064; G06F 2003/0697; G06F 3/0689; G06F 3/0601
USPC ........... 707/803, 802, 811, 795; 711/154, 170
See application file for complete search history.

(56) References Cited

U.S. PATENT DOCUMENTS

| | | | |
|---|---|---|---|
| 5,951,658 A * | 9/1999 | Daray et al. ..................... 710/56 |
| 7,158,999 B2 * | 1/2007 | Pace et al. ............................. 1/1 |
| 7,890,675 B2 | 2/2011 | Aranguren et al. |
| 2005/0172138 A1 * | 8/2005 | Ezzat ............................ 713/189 |
| 2008/0177961 A1 * | 7/2008 | McSharry et al. ............ 711/162 |
| 2010/0030828 A1 * | 2/2010 | Chauvet et al. ............... 707/205 |
| 2013/0054887 A1 | 2/2013 | Ho et al. |
| 2013/0159658 A1 | 6/2013 | Ho et al. |

OTHER PUBLICATIONS

Virtual Storage Access Method, Wikipedia, http://en.wikipedia.org/wiki/Virtual_Storage_Access_Method, downloaded May 17, 2011, pp. 1-4.

(Continued)

*Primary Examiner* — Hong Kim
(74) *Attorney, Agent, or Firm* — Zilka-Kotab, PC

(57) ABSTRACT

When using virtually stored data sets, such as virtual storage access method (VSAM) data sets, while the data set is open (referred to as an open time) static data set characteristics and/or job parameters have been defined for the VSAM data set. In one approach, a method for modifying a virtual storage access method (VSAM) data set includes opening a VSAM data set; and modifying a VSAM control block structure for the VSAM data set.

13 Claims, 4 Drawing Sheets

(56) References Cited

OTHER PUBLICATIONS

DD Statement, http://publib.boulder.ibm.com/infocenter/rbdhelp/v7r5m0/index.jsp?topic=/com.ibm.egl.gg.doc/topics/gegl_cobol_pseudojclddstatement.html, downloaded Jul. 22, 2011, pp. 1-6.
Product Brief: CA Hyper-Buf VSAM Buffer optimizer for z/VSE, 2007 CA, CA, http://www.ca.com/files/productbriefs/hyperbuf_vse_product_brief.pdf, pp. 1-3.
How VSAm Works, 2011 Innovation Data Processing, http://www.fdr.com/products/iam/, downloaded May 24, 2011, pp. 1-9.
U.S. Appl. No. 13/221,802, filed Aug. 30, 2011.
Non-Final Office Action from U.S. Appl. No. 13/221,802 dated Feb. 25, 2014.
Final Office Action from U.S. Appl. No. 13/221,802 dated Jun. 4, 2014.
Notice of Allowance and Fee(s) Due from U.S. Appl. No. 13/221,802 dated Sep. 16, 2014.

\* cited by examiner

DYNAMIC RECORD MANAGEMENT FOR SYSTEMS UTILIZING VIRTUAL STORAGE ACCESS METHOD (VSAM) DATA SETS WITH A CORRESPONDING VSAM CONTROL BLOCK STRUCTURE

RELATED APPLICATIONS

This application is a continuation of copending U.S. patent application Ser. No. 13/221,802, filed Aug. 30, 2011; which is herein incorporated by reference.

BACKGROUND

The present invention relates to data storage access and more specifically, this invention relates to dynamic record management in a system utilizing virtual storage access method (VSAM).

The virtual storage access method (VSAM) is a well-established access method that remains in current use with IBM® system architectures, and is frequently the basis for high-profile software packages such as financial management, personnel management, and other similar applications. VSAM offers an ease of utility that enables a broad range of users with diverse technical aptitude to access and utilize various applications and relevant data structures via the VSAM architecture.

For example, users and custom applications may access VSAM data sets through data definition (DD) statements written in a job control language (JCL) via dynamic allocation. Furthermore, custom access may be accomplished in online regions via the use of tools such as the customer information control system (CICS).

VSAM data set processing would, in most circumstances, benefit from an ability to make changes to this application code. Notably, when a VSAM data set is opened, certain attributes must be defined, for example, the number of buffers available for the data set to use. Since many VSAM data sets are large, complex, or both, the corresponding runtimes for data processing jobs are long, and may run into weeks or months of processing runtime, during which time the VSAM data sets remain open and unable to be changed using conventional methods.

In practice, computationally intensive data sets with such long runtimes experience fluctuations in processing efficiency resulting from corresponding fluctuations in system resource usage. For example, during normal business hours, system resources may be in a state of peak usage, and the number of available buffers (or other resources, such as memory, processors, etc.) are correspondingly low. Conversely, outside normal business hours, system resources may experience significantly less usage, and a correspondingly large amount of system resources may be idle. Thus, a user initiating a VSAM job during normal business hours may only have access to limited resources that do not accurately reflect actual system availability over the life of the job, resulting in undesirable inefficiencies.

Unfortunately, current VSAM tools strictly forbid processing characteristics from being changed after a data set is opened without stopping the job process, closing the data set, making the requested changes to static data, and subsequently resuming (or worse, restarting) the processing job anew. For dynamically allocated VSAM data sets, this type of record management tracing cannot be performed at all using standard VSAM tools—custom modules must be developed on an individual basis. This expensive and time-consuming process presents huge overhead and practical limitations on system administration because it requires constant system monitoring, as well as judgment from a human user(s), intervention, and sometimes necessitates code specific to the data set.

BRIEF SUMMARY

In one embodiment, a method for modifying a VSAM data set includes opening a VSAM data set and modifying a VSAM control block structure for the VSAM data set.

Other aspects and embodiments of the present invention will become apparent from the following detailed description, which, when taken in conjunction with the drawings, illustrate by way of example the principles of the invention.

DETAILED DESCRIPTION

Figure 1:
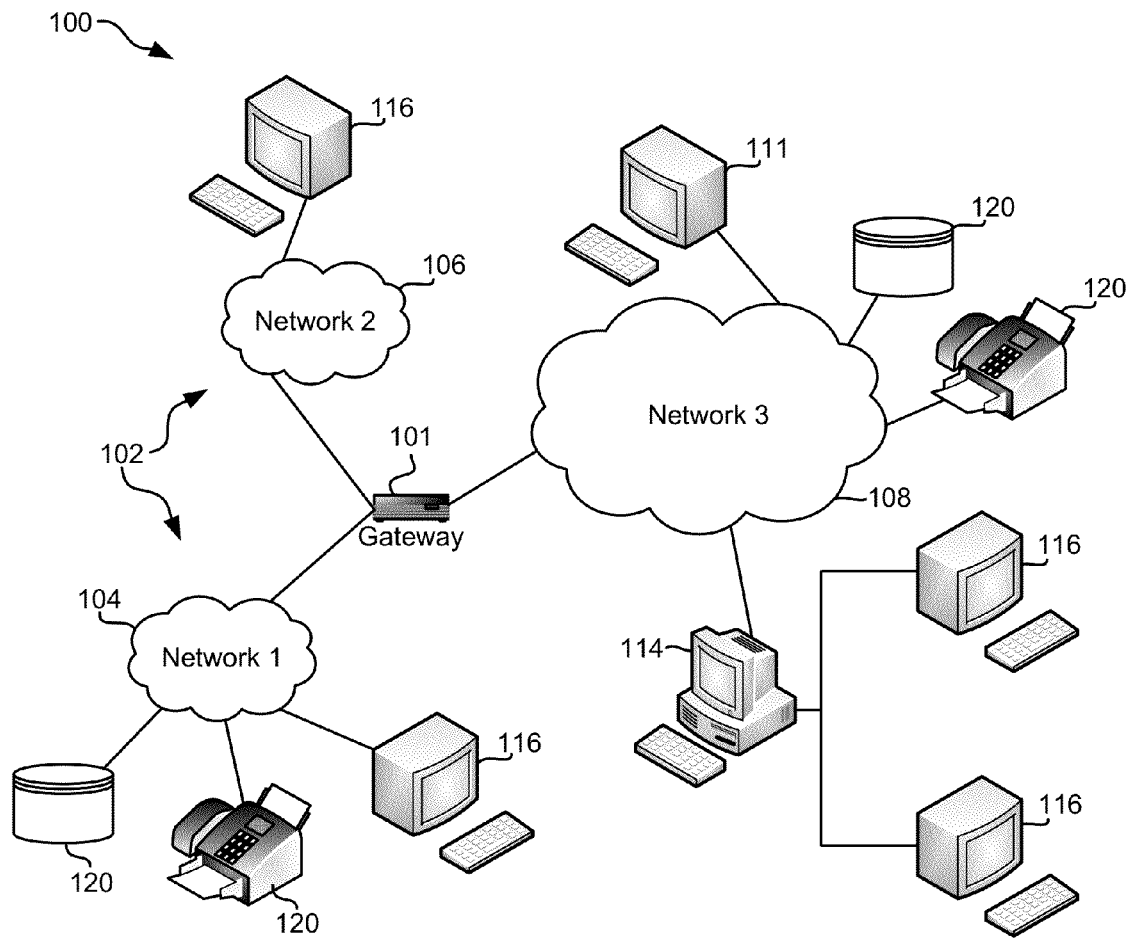
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for dynamic record management tracing in a virtual storage system, particularly those that use virtual storage access method (VSAM). In some embodiments, dynamic management of VSAM data processing jobs is enabled even after a data set has been opened and without needing to close the data set, suspend processing, or develop data set-specific modules.

In one general embodiment, a computer program product for modifying a virtual storage access method (VSAM) data set during open time includes a computer readable storage medium having computer readable program code embodied therewith, the computer readable program code including computer readable program code configured to open a VSAM data set and computer readable program code configured to modify a VSAM control block structure for the VSAM data set while the VSAM data set is open during an open time in which static data set characteristics and/or job parameters have been defined for the VSAM data set.

In another general embodiment, a storage system includes logic adapted for opening a VSAM data set, and logic adapted for modifying a VSAM control block structure for the VSAM data set while the VSAM data set is open during an open time in which static data set characteristics and/or job parameters have been defined for the VSAM data set.

According to another general embodiment, a method for modifying a VSAM data set includes opening a VSAM data set and modifying a VSAM control block structure for the VSAM data set.

In yet another general embodiment, a storage system includes logic adapted for opening a virtually stored data set, logic adapted for providing a dynamic address space associated with the data set, logic adapted for interacting with the data set within the dynamic address space using a console interface and/or a programming interface, logic adapted for building a service request block based on the dynamic address space, and logic adapted for modifying a virtually stored control block structure for the data set within the dynamic address space using the service request block.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM® z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
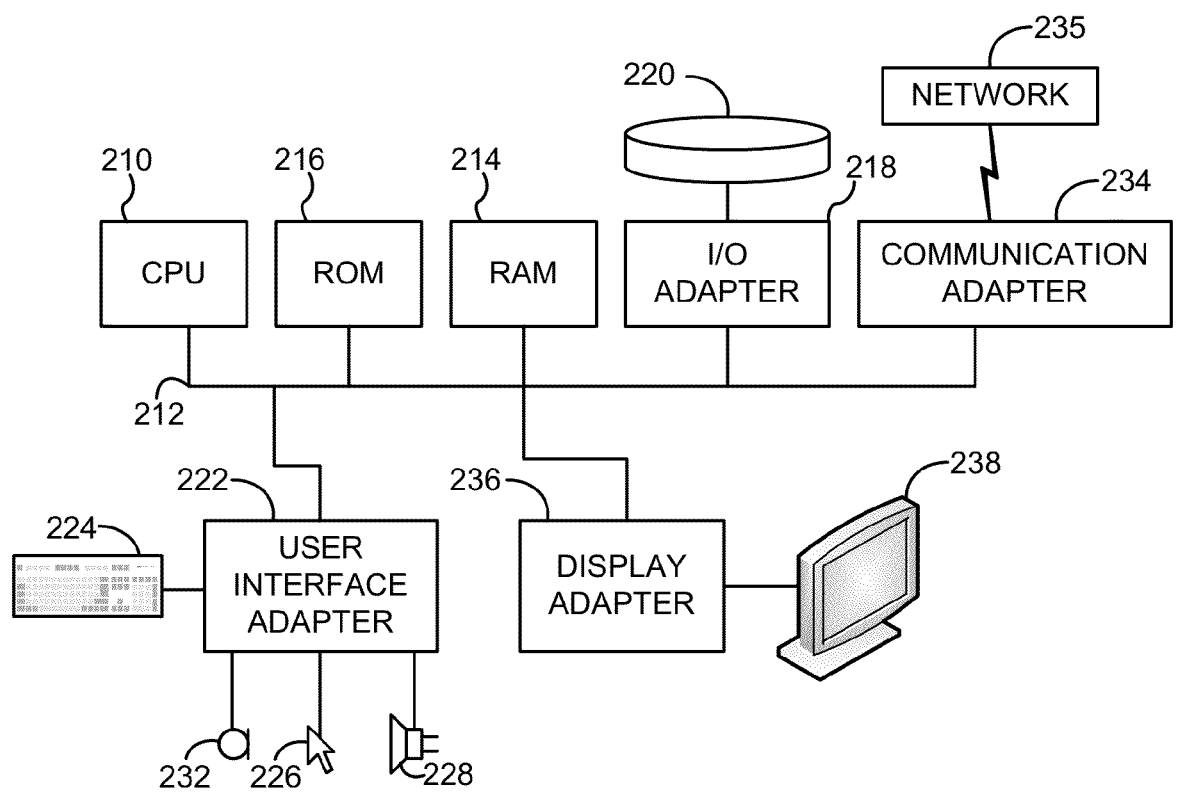
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In conventional approaches to data processing, especially processing of large and/or complex data sets, one or more users may submit processing jobs to the system architecture for optimal allocation of system resources. To facilitate optimal allocation of system resources, users will commonly define static job parameters and/or data set characteristics, such as the number of buffers and/or processors available for processing the data set, the number and/or length of processing strings, the maximum record length within the data set, the maximum number of records in the data set (data set size), the control block structure (CBS), and/or other static data set processing characteristics as would be understood by one having ordinary skill in the art upon reading the present descriptions.

For example, IBM® z/OS includes functionality for distributing job processes across a network architecture via VSAM. VSAM records may be of fixed or variable length, and are organized in fixed-size blocks called control intervals (CIs), and then into larger divisions called control areas (CAs). Together, the CIs and CAs comprise the CBS, and are assigned a static address space for that record. Custom programs can access VSAM data sets through data definition (DD) statements in job control language (JCL), via dynamic allocation, or in online regions such as in customer information control systems (CICS).

Problematically, these conventional approaches require that the static data set characteristics and job parameters be defined at the time the data set is opened for processing, referred to hereafter as the "open time." Therefore, users must possess a priori knowledge about system architecture, job requirements, and optimal parameter configurations in order to efficiently accomplish processing goals.

Furthermore, many system architectures experience dynamic fluctuations in resource availability throughout the course of a processing job. For example, system resources may be at a peak usage level during normal business hours when many users are simultaneously accessing and/or requesting system resources for job processing.

Conversely, outside normal business hours, system resources may experience a lull in usage, with greater resource availability during the lull. Therefore, a user submitting a job during normal business hours may configure the job to run efficiently according to resource availability during peak system usage hours, but this configuration may not necessarily be an efficient configuration outside those peak hours, and available system resources may sit idly where they could be put to work processing computationally intensive jobs.

Additionally, once static data set characteristics and job parameters are set at open time, they cannot be manipulated during processing. Modifications require suspension or termination of the processing job so that the data set may be closed and desired alterations be made. Because many processing jobs utilize large and/or complex data sets, they have correspondingly long runtimes and high computational costs. Therefore, making alterations to processing job parameters and/or data set characteristics currently presents negative implications for system production.

Moreover, many processing jobs require diagnostic monitoring during runtime in order to determine where processing errors occur, to determine their cause, and/or to identify the appropriate modifications to the job configuration to optimize processing efficiency. In one exemplary approach under the z/OS system architecture, users may attempt to diagnostically monitor processing jobs by initiating a record management trace (RMT). As with job parameters and data set characteristics, traces must be defined at open time, and they therefore incur similar limitations on processing efficiency as described above. Even if the applications processing data sets are stable and include functionality to determine when job parameters or data set characteristics would benefit from modification, those modifications are impossible without terminating the processing operation. Furthermore, dynamically allocated data sets, such as catalogs, cannot be subjected to diagnostic RMT because there is no data definition (DD) statement and there is no JCL statement code upon which to put the job parameters. Therefore, dynamically allocated data sets require developing a custom module specifically for the particular data set. Thus, current RMT limitations present heavy overhead for system administrators and further impair production efficiency.

These limitations of RMT are well-known in the art, and solutions have been attempted by several developers, particularly regarding buffer allocation. For example, the CA Hyper-Buf VSAM buffer optimization product optimizes available buffer space based on several user-defined criteria. Additionally, Innovation® Real Time Tuning monitors input/output (I/O) activity and reactively adapts buffer availability while eliminating I/O to the index. However, neither these nor any other art of record are capable of truly dynamic buffer allocation because all operate by suspending or terminating processing, closing data sets, adjusting buffer allocation, and reopening the data set(s). Truly dynamic buffer allocation requires that these modifications can be made seamlessly during open time.

In one embodiment, a dynamic record management trace (DRMT) may be accomplished by providing a separate address space, such as a VSAM address space, which may be referred to as a dynamic address space or a VSAM dynamic address space according to some approaches, within which users may interact with virtually stored data sets, such as VSAM data sets, and make changes to associated jobs' parameters and/or data set characteristics, such as VSAM data set characteristics, even during open time in which static data set characteristics and/or job parameters have been defined for the data set.

The VSAM dynamic address space, in one embodiment, provides an interface for an operator to interact with VSAM data sets. In an exemplary approach under the z/OS system architecture, version 1.12, the VSAM dynamic address space includes functionality to dynamically enable VSAM record management trace(s) in any address space. Further implementations of the VSAM dynamic address space may include dynamic allocation and/or deallocation of buffers, strings, and/or other normally static data set characteristics, in various approaches.

Figure 3:
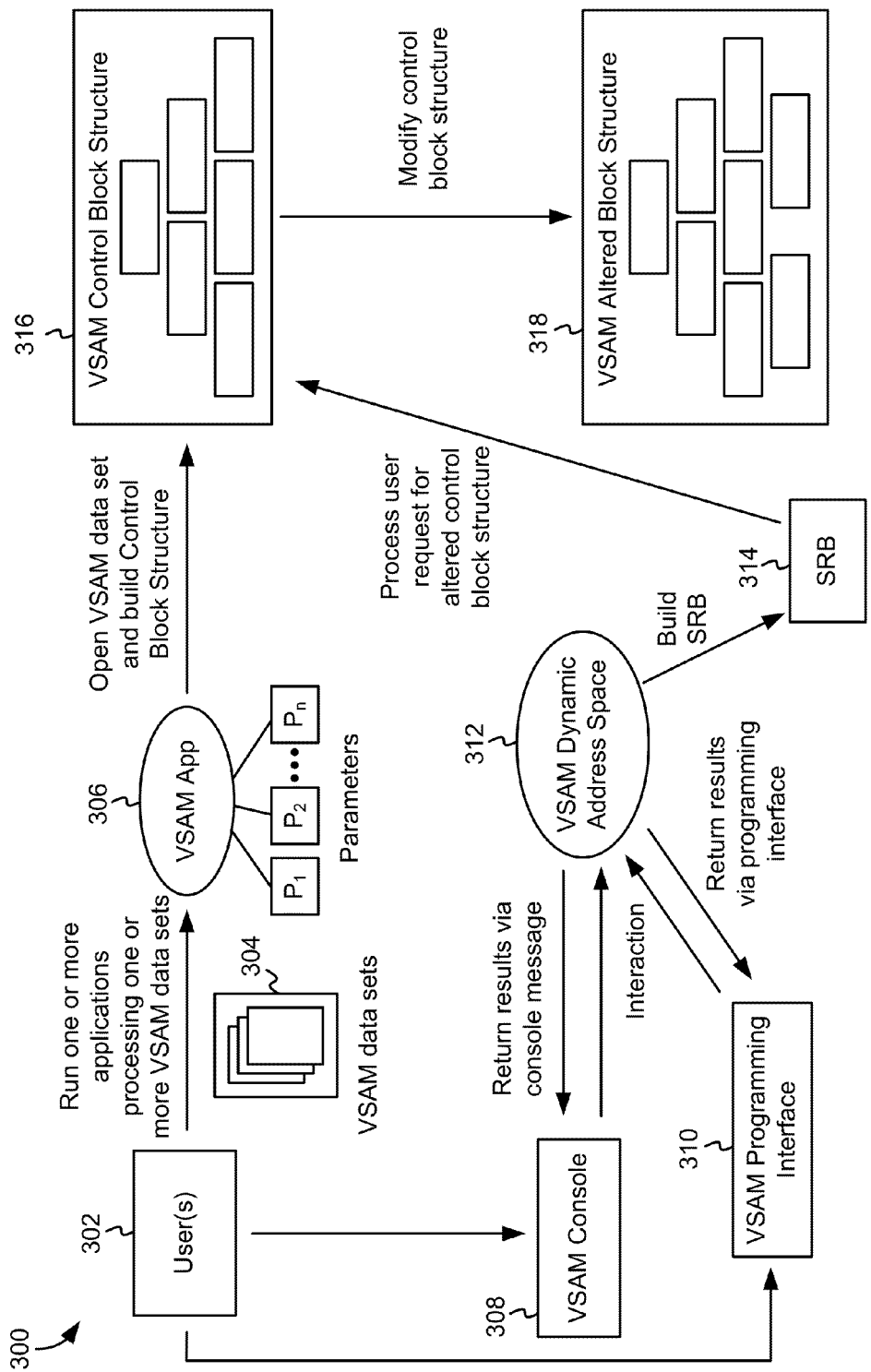
FIG. 3 shows a VSAM processing modification system, according to one embodiment.

Now referring to FIG. 3, a VSAM processing modification system 300 is shown, according to one embodiment. The system 300 may include more or less functionality, modules, logic, etc., than that which is shown in FIG. 3, according to various embodiments, and as would be appreciated by one of skill in the art upon reading the present descriptions.

In one embodiment, one or more users 302 may run one or more applications 306 in order to process one or more VSAM data sets 304. Running the one or more applications 306 may include submitting one or more job parameters $P_1, P_2, \ldots, P_n$. Parameters $P_1, P_2, \ldots, P_n$ may be configured in any appropriate manner under the system architecture. In one exemplary embodiment illustrating this functionality within the z/OS architecture, parameter configuration may be accomplished, for example, by submitting instructions via a DD or JCL statement. The VSAM application 306 then opens the one or more VSAM data sets 304 and builds the associated control block structure 316.

Of course, in other embodiments the system 300 may utilize VSAM data sets 304 already being processed by a previously initiated instance of a VSAM application 306 which may therefore have a pre-existing control block structure 316.

In further embodiments, upon determining that a processing job would benefit from reconfiguring job parameters and/or data set characteristics, one or more users 302 may interact with the VSAM dynamic address space 312 and/or associated data set(s) 304 by issuing one or more commands to the system 300 from a VSAM console 308, such as through a console interface. In operation, the commands may direct the VSAM dynamic address space 312 to interpret the command, locate the target VSAM control block structure 316, and/or schedule a service request block (SRB) 314 to process the user request to alter a job's control block structure 316. The SRB 314 may subsequently cause the control block structure 316 to be altered in the new address space within VSAM dynamic address space 312, resulting in a VSAM altered block structure 318 reflecting the desired job parameter and/or data set characteristic modifications. Thereafter, the VSAM application 306 utilizes the VSAM altered block structure 318 to continue processing the relevant data set(s) 304. Furthermore, the SRB 314 may return results of the modifications to the VSAM dynamic address space 312, which may subsequently convey the results to the user(s) 302 via the console interface 308 upon completing the requested commands. The results may indicate, among other relevant data, whether the request was successfully completed or not, parameters and/or characteristics changed, etc.

In some embodiments, the SRB 314 may be scheduled under the console interface 308. In other embodiments, the SRB 314 may process the request very quickly, for example in less than about two seconds, so that the SRB operations do not serve as rate-limiting steps in the overall modification process, in some approaches.

In other embodiments, user(s) 302 may interact with the VSAM dynamic address space 312 and/or relevant data sets 304 through a programming interface 310, which allows user(s) 302 to design computer readable program code to manage the VSAM dynamic address space 312. Furthermore, managing the VSAM dynamic address space 312 via the programming interface 310 may additionally include employing VSAM DRMT. Additionally, the programming interface 310 may return one or more codes to the system 300 indicating, for example, whether the desired modifications submitted through the programming interface 310 were accomplished or not (e.g. return "0" for success, and return "1" for failure). In more approaches, it may return strings which indicate results of the modifications to the VSAM altered block structure 318, or any other results as would be understood by one of skill in the art upon reading the present descriptions.

In still other embodiments, the programming interface 310 may include logic for interacting with the VSAM dynamic address space 312 and/or relevant data set(s) 304 that is independent of VSAM logic. Therefore, the one or more users 302 may not need to utilize VSAM logic in order to manage modifications to job parameters and/or data set characteristics, in some approaches.

Figure 4:
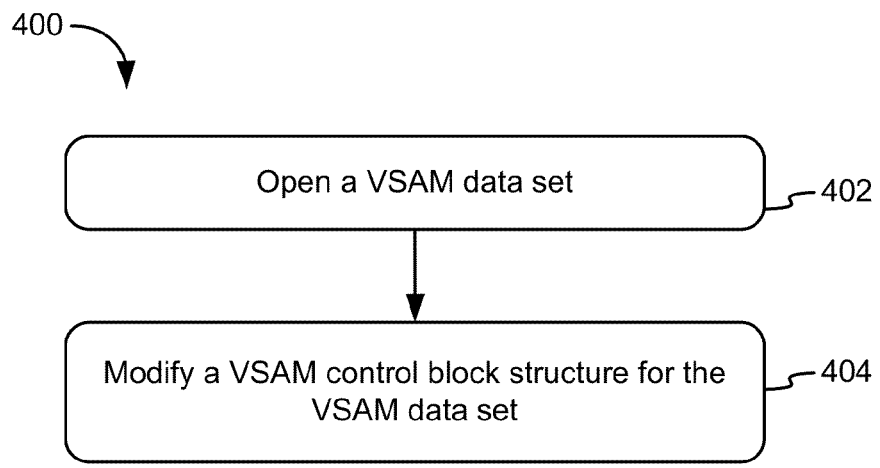
FIG. 4 shows a flowchart of a method, according to one embodiment.

Referring now to FIG. 4, a method 400 for modifying a VSAM data set during open time is shown according to one embodiment. The method 400 may be carried out in any desired environment, including those shown in FIGS. 1-3, among others. Of course, more or less operations than those specifically described below may be included in method 400, as would be apparent to one of skill in the art upon reading the present descriptions.

In operation 402, a VSAM data set is opened for processing. In some embodiments, the VSAM data set may be opened for processing by a VSAM application. In further embodiments, more than one VSAM data set may be opened, with each VSAM data set being processed by one or more VSAM applications.

In operation 404, a VSAM control block structure for the VSAM data set is modified.

In some embodiments, the method 400 may further include executing an application, such as a VSAM application, the application processing the VSAM data set. In these embodiments, the VSAM control block structure has not been built or cannot be located, and so the method 400 may include building the VSAM control block structure for the VSAM data set.

In alternative embodiments, the method 400 may further include executing an application, such as a VSAM application, the application processing the VSAM data set. In these embodiments, the method 400 includes locating the VSAM control block structure associated with the VSAM data set being processed by the VSAM application.

In another embodiment, the method 400 may include indicating results of the modification of the VSAM control block structure, as described previously.

In one approach, modifying the VSAM control block structure may comprise providing a VSAM dynamic address space associated with the VSAM data set, interacting with the VSAM data set within the VSAM dynamic address space using a VSAM console interface and/or a VSAM programming interface, and building a SRB based on the VSAM dynamic address space. The SRB modifies the VSAM control block structure within the VSAM dynamic address space, thereby creating a VSAM altered block structure. In a further approach, interacting with the VSAM data set within the VSAM dynamic address space comprises at least one of changing one or more parameters of at least one associated job, changing at least one VSAM data set characteristic, and dynamically enabling at least one VSAM record management trace in any address space. The at least one VSAM data set characteristic comprises one or more of: allocation of buffers, deallocation of buffers, record properties (e.g., record size, record location, record naming conventions, etc.), a data set size (e.g., a number of records), and string properties (e.g., string length, string naming conventions, etc.).

Figure 5:
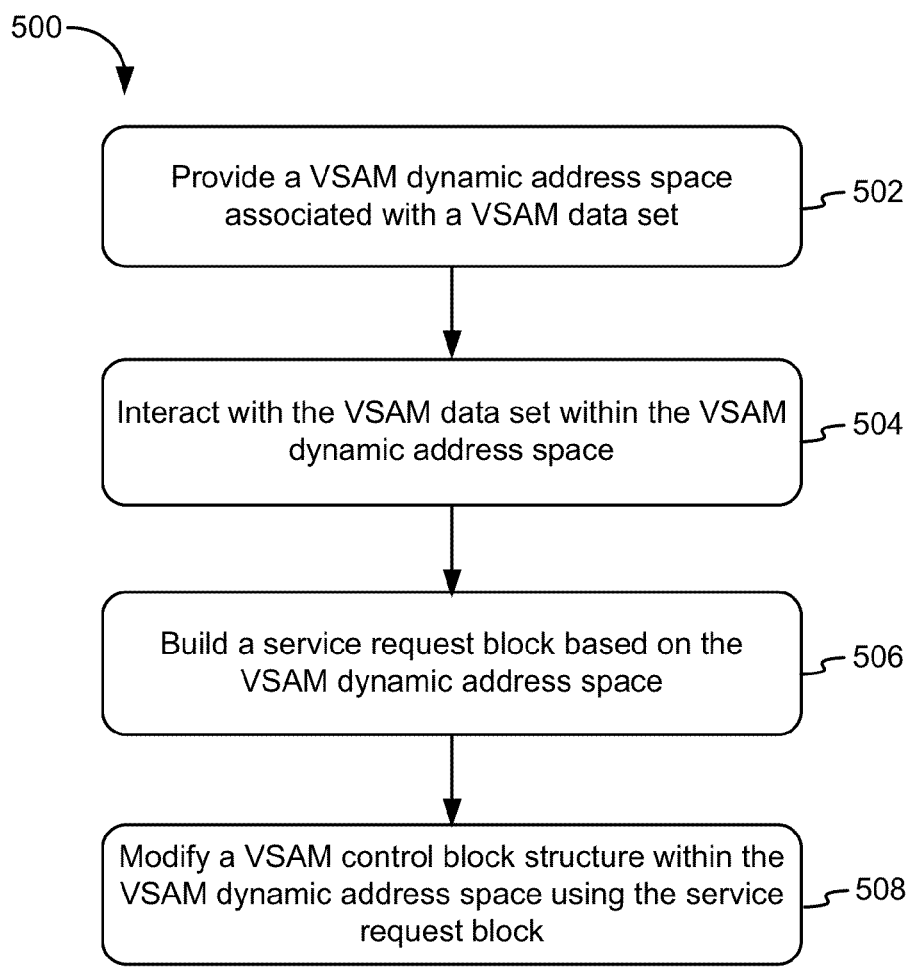
FIG. 5 shows a flowchart of a method, according to one embodiment.

Referring now to FIG. 5, a method 500 for modifying a VSAM control block structure during open time is shown according to one embodiment. The method 500 may be carried out in any desired environment, including those shown in FIGS. 1-4, among others. Of course, more or less operations than those specifically described below may be included in method 500, as would be apparent to one of skill in the art upon reading the present descriptions.

In operation 502, a VSAM dynamic address space associated with a VSAM data set is provided. This dynamic address space may be used to enact changes to a VSAM control block structure associated with the VSAM data set.

In operation 504, interaction with the VSAM data set is performed within the VSAM dynamic address space.

In operation 506, a service request block is built, based on the VSAM dynamic address space.

In operation 508, the VSAM control block structure is modified within the VSAM dynamic address space using the service request block.

In one embodiment, modifying the VSAM control block structure may comprise providing a VSAM dynamic address space associated with the VSAM data set, interacting with the VSAM data set within the VSAM dynamic address space using a VSAM console interface and/or a VSAM programming interface, and building a SRB based on the VSAM dynamic address space. The SRB modifies the VSAM control block structure within the VSAM dynamic address space, thereby creating a VSAM altered block structure. In a further approach, interacting with the VSAM data set within the VSAM dynamic address space comprises at least one of changing one or more parameters of at least one associated job, changing at least one VSAM data set characteristic, and dynamically enabling at least one VSAM record management trace in any address space. The at least one VSAM data set characteristic comprises one or more of: allocation of buffers, deallocation of buffers, record properties (e.g., record size, record location, record naming conventions, etc.), a data set size (e.g., a number of records), and string properties (e.g., string length, string naming conventions, etc.).

In some embodiments, the method 500 may further include executing an application, such as a VSAM application, the application processing the VSAM data set. In these embodiments, the VSAM control block structure has not been built or cannot be located, and so the method 500 may include building the VSAM control block structure for the VSAM data set.

In alternative embodiments, the method 500 may further include executing an application, such as a VSAM application, the application processing the VSAM data set. In these embodiments, the method 500 includes locating the VSAM control block structure associated with the VSAM data set being processed by the application.

In another embodiment, the method 500 may include indicating results of the modification of the VSAM control block structure, as described previously.

In another embodiment, a computer program product for modifying a VSAM data set during open time comprises a computer readable storage medium having computer readable program code embodied therewith. The computer readable program code comprises computer readable program code configured to: open a VSAM data set, provide a VSAM dynamic address space associated with the VSAM data set, interact with the VSAM data set within the VSAM dynamic address space using a VSAM console interface and/or a VSAM programming interface, build a service request block based on the VSAM dynamic address space, and modify a VSAM control block structure for the VSAM data set within the VSAM dynamic address space using the service request block.

In various approaches, any of the embodiments relating to the above described methods may be included in the computer program product, as would be understood by one of skill upon reading the present descriptions.

In another embodiment, a system comprises logic adapted for opening a VSAM data set, logic adapted for providing a VSAM dynamic address space associated with the VSAM data set, logic adapted for interacting with the VSAM data set within the VSAM dynamic address space using a VSAM console interface and/or a VSAM programming interface, logic adapted for building a SRB based on the VSAM dynamic address space, and logic adapted for modifying a VSAM control block structure for the VSAM data set within the VSAM dynamic address space using the SRB.

In further embodiments, the system may include logic adapted for executing an application, the application processing the VSAM data set, and logic adapted for building the VSAM control block structure for the VSAM data set.

In more embodiments, the system may include logic adapted for executing an application, the application processing the VSAM data set, and logic adapted for locating the VSAM control block structure associated with the VSAM data set being processed by the VSAM application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for modifying a virtual storage access method (VSAM) data set, the method comprising:
   opening, using a processor, a VSAM data set;
   providing, using the processor, a VSAM dynamic address space associated with the VSAM data set; and
   modifying, using the processor, a VSAM control block structure for the VSAM data set using the VSAM dynamic address space while the VSAM data set is open during an open time in which static data set characteristics and/or job parameters have been defined for the VSAM data set,
   wherein the modifying the VSAM control block structure further comprises:
      interacting with the VSAM data set within the VSAM dynamic address space using a VSAM console interface and/or a VSAM programming interface; and
      building a service request block based on the VSAM dynamic address space,
      wherein the service request block modifies the VSAM control block structure within the VSAM dynamic address space.

2. The method as recited in claim 1, wherein interacting with the VSAM data set within the VSAM dynamic address space comprises at least one of:
   changing one or more parameters of at least one associated job;
   changing at least one VSAM data set characteristic; and
   dynamically enabling at least one VSAM record management trace in any address space.

3. The method as recited in claim 2, wherein the at least one data set characteristic includes one or more of:
   allocation of buffers;
   deallocation of buffers;
   record properties;
   a data set size; and
   string properties.

4. The method as recited in claim 1, further comprising:
   executing an application, the application processing the VSAM data set and building the VSAM control block structure for the VSAM data set; or
   locating the VSAM control block structure.

5. The method as recited in claim 1, wherein interacting with the VSAM data set within the VSAM dynamic address space comprises indicating results of the modification of the VSAM control block structure.

6. The method as recited in claim 1, wherein interacting with the VSAM data set within the VSAM dynamic address space occurs while the VSAM data set is open.

7. A method for modifying a data set, the method comprising:
   opening, using the processor, a virtually stored data set;
   providing, using the processor, a dynamic address space associated with the virtually stored data set;
   interacting, using the processor, with the virtually stored data set within the dynamic address space using a console interface and/or a programming interface;
   building, using the processor, a service request block based on the dynamic address space; and
   modifying, using the processor, a virtually stored control block structure for the virtually stored data set within the dynamic address space using the service request block.

8. The method as recited in claim 7, further comprising:
   executing an application, the application being configured to process the virtually stored data set; and
   building the virtually stored control block structure for the virtually stored data set prior to modifying the virtually stored control block structure using the service request block.

9. The method as recited in claim 7, further comprising:
   executing an application, the application being configured to process the virtually stored data set; and
   locating the virtually stored control block structure associated with the virtually stored data set as it is processed by the application.

10. The method as recited in claim 7, wherein interacting with the virtually stored data set within the dynamic address space comprises indicating results of the modification of the virtually stored control block structure.

11. The method as recited in claim 7, wherein interacting with the virtually stored data set within the dynamic address space occurs while the virtually stored data set is open.

12. The method as recited in claim 7, wherein interacting with the virtually stored data set within the dynamic address space comprises at least one of:
   changing one or more parameters of at least one associated job of the virtually stored data set;
   changing at least one characteristic of the virtually stored data set; and
   dynamically enabling at least one record management trace in any address space.

13. The method as recited in claim 12, wherein the at least one characteristic of the virtually stored data set includes one or more of:
   allocation of buffers;
   deallocation of buffers;
   record properties;
   a size of the virtually stored data set; and
   string properties.

* * * * *